United States Patent
Fikes

(10) Patent No.: US 10,021,904 B1
(45) Date of Patent: Jul. 17, 2018

(54) FOOD PROCESSING SYSTEMS

(71) Applicant: Raymond Fikes, Fountain Hills, AZ (US)

(72) Inventor: Raymond Fikes, Fountain Hills, AZ (US)

( * ) Notice: Subject to any disclaimer, the term of this patent is extended or adjusted under 35 U.S.C. 154(b) by 483 days.

(21) Appl. No.: 14/601,079

(22) Filed: Jan. 20, 2015

Related U.S. Application Data

(60) Provisional application No. 61/928,943, filed on Jan. 17, 2014.

(51) Int. Cl.
  *A23P 1/08* (2006.01)
  *A23L 1/00* (2006.01)

(52) U.S. Cl.
  CPC .............. *A23P 1/087* (2013.01); *A23L 1/0073* (2013.01); *A23V 2002/00* (2013.01)

(58) Field of Classification Search
  CPC ..... A23P 1/087; A23L 1/0073; A47J 31/4403; A47J 17/16; A47J 43/00; A47J 37/106
  See application file for complete search history.

(56) References Cited

U.S. PATENT DOCUMENTS

| | | | | |
|---|---|---|---|---|
| 2,061,315 A | * | 11/1936 | Rohwedder | B26D 7/088 29/DIG. 69 |
| 2,927,401 A | * | 3/1960 | Little | A01G 7/06 111/7.2 |
| 4,294,861 A | | 10/1981 | Ifuku et al. | |
| 5,817,360 A | * | 10/1998 | Pao | A23N 7/00 426/478 |
| 5,900,265 A | | 5/1999 | Rutherford | |
| 6,415,697 B1 | * | 7/2002 | Brash | B26D 1/22 426/518 |
| 6,854,383 B2 | | 2/2005 | Wang | |
| 7,077,058 B2 | | 7/2006 | Muro | |
| D535,534 S | | 1/2007 | Wong | |
| D669,324 S | | 10/2012 | Bodum | |
| D689,348 S | | 9/2013 | Wong | |
| 8,596,176 B1 | | 12/2013 | Wagner | |

(Continued)

OTHER PUBLICATIONS

"Eurodib Apple Peeler by Bron Coucke," offered for sale in the U.S. online by Bed Bath & Beyond Inc. at least as early as Jan. 8, 2012 at http://www.bedbathandbeyond.com/product.asp?SKU=18196751&RN=1150&, not currently on sale online, photo image of product on last page of document taken from a separate web page at http://www.bedbathandbeyond.com/store/product/eurodib-apple-peeler-by-bron-coucke/1018196751, both websites last visited Jan. 10, 2015.

(Continued)

*Primary Examiner* — Anthony Weier
(74) *Attorney, Agent, or Firm* — IPTechLaw

(57) ABSTRACT

A food processing system includes a slicer configured to slice a food item so the food item has at least one gap present between slices in the food item during slicing of the food item, and an infuser coupled with the slicer and including a reservoir containing an infusion ingredient, the infuser configured to deposit a portion of the infusion ingredient into the at least one gap during slicing. The infuser may be positioned to infuse the infusion ingredient between surfaces formed by a spiral cut in the food item during slicing. A peeler configured to peel the food item may be included. A corer configured to core the food item may also be included.

15 Claims, 14 Drawing Sheets

(56) References Cited

U.S. PATENT DOCUMENTS

| | | | |
|---|---|---|---|
| 2002/0195003 A1 | 12/2002 | Backus et al. | |
| 2009/0068327 A1 | 3/2009 | Iglesias | |
| 2011/0011280 A1 | 1/2011 | Hawker et al. | |
| 2011/0139016 A1* | 6/2011 | Romano | A47J 43/20 99/450.8 |
| 2011/0311700 A1* | 12/2011 | Shah | A23B 4/064 426/518 |
| 2013/0081544 A1* | 4/2013 | Wang | A23C 11/103 99/275 |

OTHER PUBLICATIONS

"Progressive International Apple Machine," offered for sale in the U.S. online by Wal-Mart Stores, Inc. at least as early as Oct. 22, 2011 at http://www.walmart.com/ip/Progressive-International-Apple-Machine/16637043.

"Starfrit Rotato Express Electric Peeler," on sale in the U.S. online by Wal-Mart Stores, Inc. at least as early as Jan. 25, 2011 at http://www.walmart.com/ip/Starfrit-Rotato-Express-Electric-Peeler/1244228.

"Starfrit Apple Pro-Peeler," on sale in the U.S. online by Wal-Mart Stores, Inc. at least as early as Nov. 22, 2013 at http://www.walmart.com/ip/Starfrit-Apple-Pro-Peeler/28329881.

"Maxam KTAPPLE2 Maxam Apple Peeler/corer/slicer," on sale in the U.S. online by Wal-Mart Stores, Inc. at least as early as Dec. 30, 2013 at http://www.walmart.com/ip/Maxam-KTAPPLE2-Maxam-Apple-Peeler-corer-slicer/29910401.

"Starfrit 93169 Rotato—Manual," on sale in the U.S. online by Amazon.com, Inc. at least as early as Feb. 1, 2010 at http://www.amazon.com/Starfrit-93169-Rotato-Manual-peeler/dp/B00X9CDL2, last visited Jan. 10, 2015.

"Norpro 864 Apple Mate 2—Apple, Potato, Parer, Slicer & Corer," on sale in the U.S. online by Amazon.com, Inc. at least as early as Oct. 8, 2013 at http://www.amazon.com/Norpro-864-2-Apple-Potato-Slicer/dp/B000HJ9BPE, last visited Jan. 10, 2015.

"Victorio VK91011 Apple and Potato Peeler, Clamp Base," on sale in the U.S. online by Amazon.com, Inc. at least as early as Jun. 26, 2010 at http://www.amazon.com/gp/product/B001DLP4EM/ref=pd_lpo_sbs_dp_ss_1?pf_rd_p=1944687522&pf_rd_s=lpo-top-stripe-1&pf_rd_t=201&pf_rd_i=B000HJ9BPE&pf_rd_m=ATVPDKIKX0DER&pf_rd_=0YQWKPT25RFKHFEKAN7H, last visited Jan. 10, 2015.

"Norpro 865 Apple Master—Apple, Potato, Parer, Slicer & corer with Vacuum Base & Clamp," on sale in the U.S. online by Amazon.com, Inc. at least as early as Sep. 6, 2013 at http://www.amazon.com/Norpro-865-Master-Apple-Potato-Slicer/dp/B00BJ0DIF4, last visited Jan. 10, 2015.

\* cited by examiner

FOOD PROCESSING SYSTEMS

CROSS REFERENCE TO RELATED APPLICATIONS

This document claims the benefit of the filing date of U.S. Provisional Patent Application 61/928,943, entitled "Peeling, Coring, Slicing and Infusing Device and Related Methods," naming as first inventor Raymond Fikes, which was filed on Jan. 17, 2014, the disclosure of which is hereby incorporated entirely herein by reference.

BACKGROUND

1. Technical Field

Aspects of this document relate generally to devices and methods used to process foods. Specific implementations involve devices used to do one or more of the following to a food item: a peeling operation; a coring operation; a slicing operation, a paring operation, and/or; an infusing operation. Specific implementations involve devices used to mold a food item such as a dough into a desired shape.

2. Background Art

Devices exist for making various alterations to food items. Peelers are available which are designed to pare a food item and/or remove a peel or outer skin from a fruit, vegetable or other food item. Knives and other blades exist for paring a food item and/or for slicing a food item, cutting it into smaller segments, and the like. Coring devices also exist for removing a core of a fruit or other item—such as removing the core of an apple. Devices also exist which perform the functions of peeling/paring, slicing, and coring of a food item using a single device.

SUMMARY

Implementations of food processing systems may include: a slicer configured to slice a food item so that the food item has at least one gap present between slices in the food item during slicing of the food item, and; an infuser coupled with the slicer and including a reservoir containing an infusion ingredient, the infuser configured to deposit a portion of the infusion ingredient into the at least one gap during slicing.

Implementations of food processing systems may include one, all, or any of the following:

The infuser may be positioned to infuse the infusion ingredient between surfaces formed by a spiral cut in the food item during slicing.

A peeler configured to peel the food item.

A corer configured to core the food item.

The infuser may include a hollow cylindrical tube having a tapered dispensing end.

The infuser may include a manually operated syringe or a motorized piston.

The infuser may include a pneumatic element or a rolling element configured to dispense the infusion ingredient from a flexible pouch.

Implementations of food processing systems may include: a base configured to rest on a flat surface; a food holder coupled with the base and configured to hold a food item; a food processor coupled with the base and including a slicer configured to slice the food item; a rotator coupled with the base and configured to rotate the food item relative to the food processor; a linear displacer coupled with the base and configured to linearly displace the food item relative to the food processor in a direction substantially perpendicular to a rotation of the rotator, and; an infuser coupled with the base and configured to deposit an infusion ingredient between slices of the food item during slicing of the food item.

Implementations of food processing systems may include one, all, or any of the following:

The infuser may include a dispensing end positioned immediately behind the slicer relative to an unsliced portion of the food item.

The infuser may be configured to deposit the infusion ingredient into a plurality of gaps located between the slices of the food item while the slicer is slicing the food item.

The infuser may be operatively coupled with the rotator so that the infuser deposits the infusion ingredient between the slices of the food item in response to the rotation of the rotator.

The infuser may be controlled by a piston that is driven independent of the rotation of the rotator.

The infusion ingredient may include a liquid or a gel.

A corer configured to core the food item.

A peeler configured to peel the food item.

The rotator may include a retention member extending radially outwards from an axis of the rotator configured to contact an outer surface of the food item when insertion pins of the food holder are inserted into the food item.

Implementations of methods of preparing a food item may include: coupling a rotator of a food processing system with a food item, the rotator coupled with a base configured to rest on a flat surface; rotating the rotator using one of a manual handle and a motor; rotating the food item; linearly displacing the food item relative to a slicer coupled with the base in a direction substantially perpendicular to a rotation of the food item; slicing the food item with the slicer to form a gap between slices of the food item, and; simultaneous with slicing the food item, infusing an infusion ingredient into the gap with an infuser coupled with the base.

Implementations of methods of preparing a food item may include one, all, or any of the following:

Slicing the food item with the slicer may include forming a plurality of gaps between the slices of the food item and the method may further include infusing the infusion ingredient into the plurality of gaps while the slicer is slicing the food item.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components, assembly procedures or method elements disclosed herein. Many additional components, assembly procedures and/or method elements known in the art consistent with the intended food processing systems and related methods will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such food processing systems and related methods, and implementing components and methods, consistent with the intended operation and methods.

Any of the food processing systems and related methods disclosed herein may include any of the elements, sub elements, characteristics, features, methods, sub-methods, and the like, disclosed in U.S. Pat. No. 6,854,383, listing as first inventor Phillip Wang, titled "Apple/Potato Peeler," issued Feb. 15, 2005 (hereinafter referred to as "Wang"), the disclosure of which is entirely incorporated herein by reference.

Figure 1:
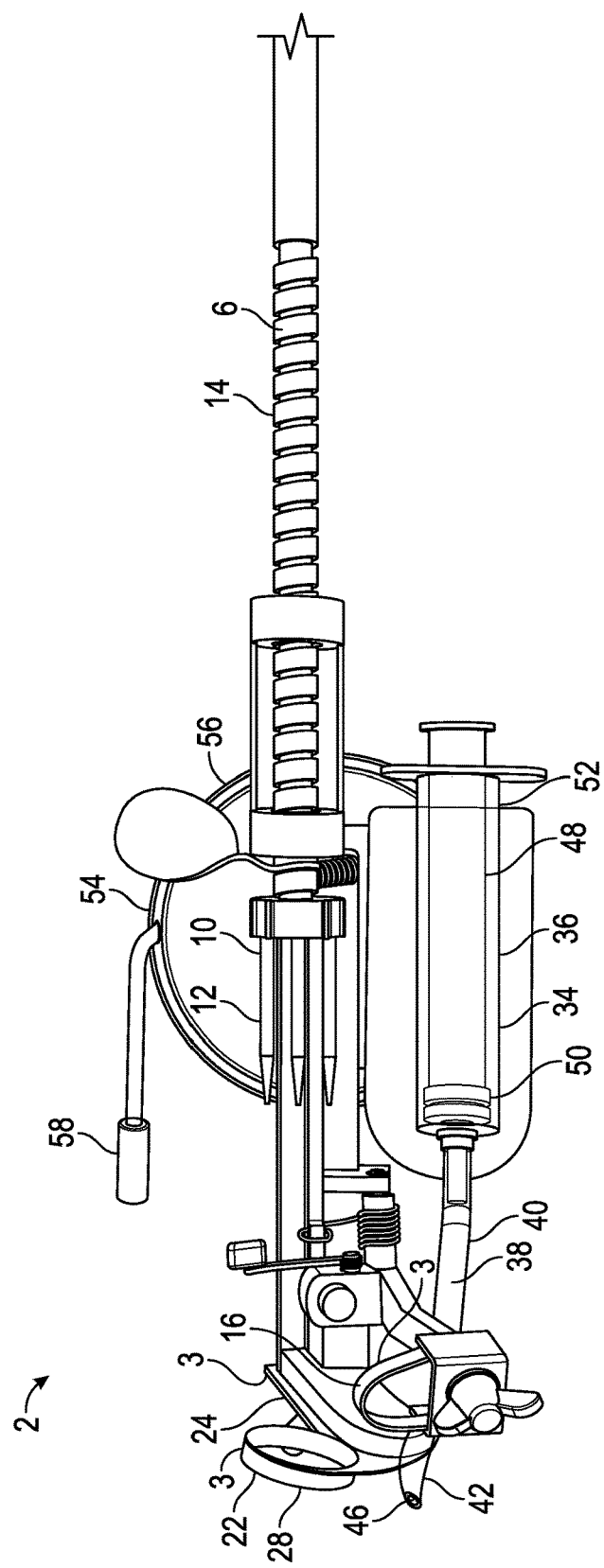
FIG. 1 is a top view of an implementation of a food processing system.
Figure 2:
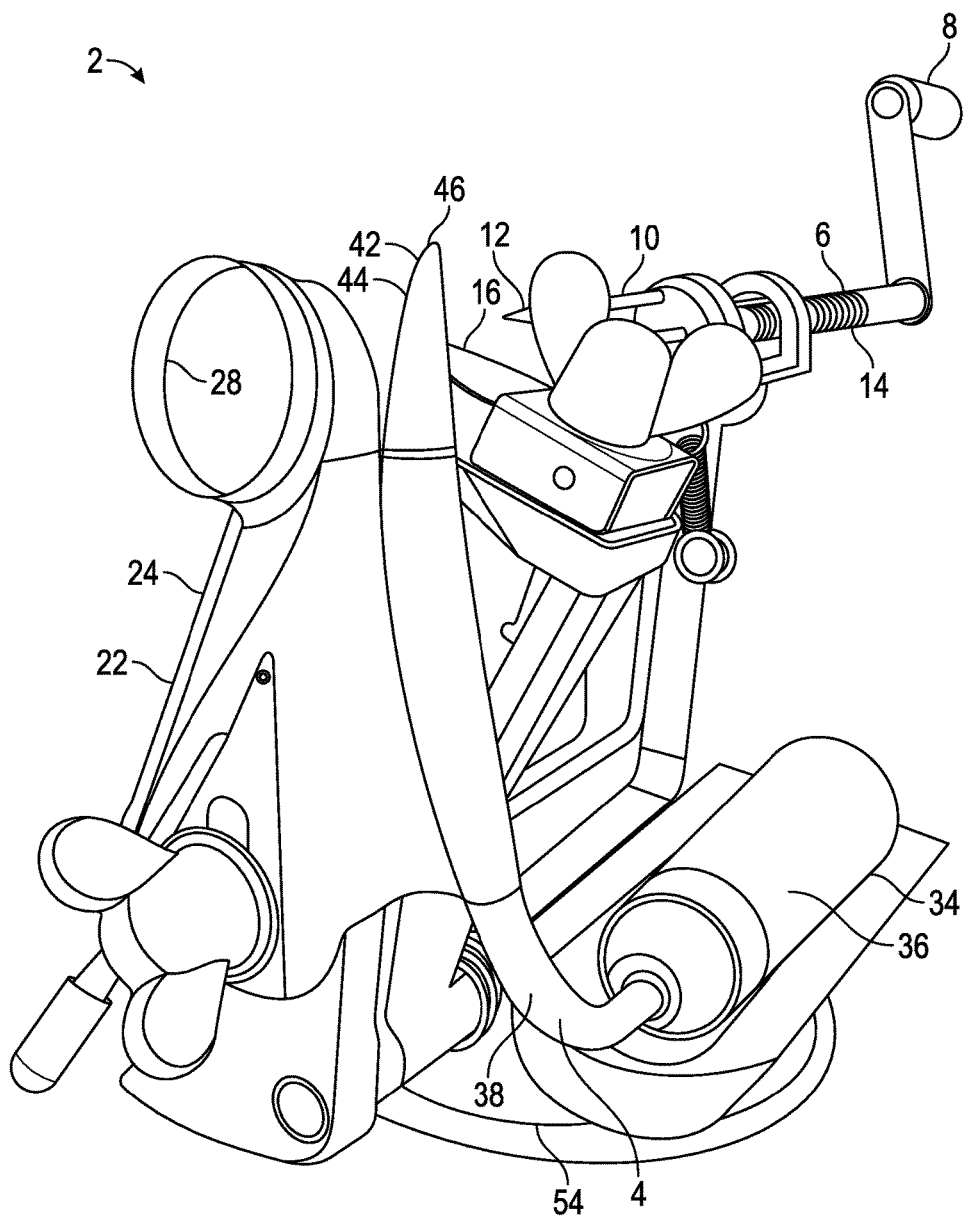
FIG. 2 is a front perspective view of the food processing system of FIG. 1.

Referring now to FIGS. 1-2, in implementations a food processing system (system) 2 includes a base 54 configured to rest on a flat surface. Base 54 includes a suction element 56 that is activated and deactivated using an engager 58. In implementations a base may be used which does not include a suction element 56 or an engager 58 but may include other elements to couple to a surface such as, by non-limiting example, a vice or clamp, screws or bolts, a friction fit, a glue, a magnetic coupling, or the like. In implementations a base may be used which does not include any element to affix the base to a flat surface, but the base may simply rest upon the flat surface. A base which affixes the base to the flat surface, at least temporarily, such as with the suction element 56 or the other elements described herein, however, may facilitate easier or more effective use of the system 2 by preventing system 2 from moving too much in undesirable ways while the system is being operated.

System 2, as with the other systems described herein, includes at least one food processor 3. In implementations, as in the versions of system 2 shown in the drawings, system 2 includes multiple food processors 3, including a peeler 16 and a coring and slicing member 22. The coring and slicing member 22 includes a slicer 24 and a corer 28. Accordingly, system 2 includes three food processors 3.

Figure 9:
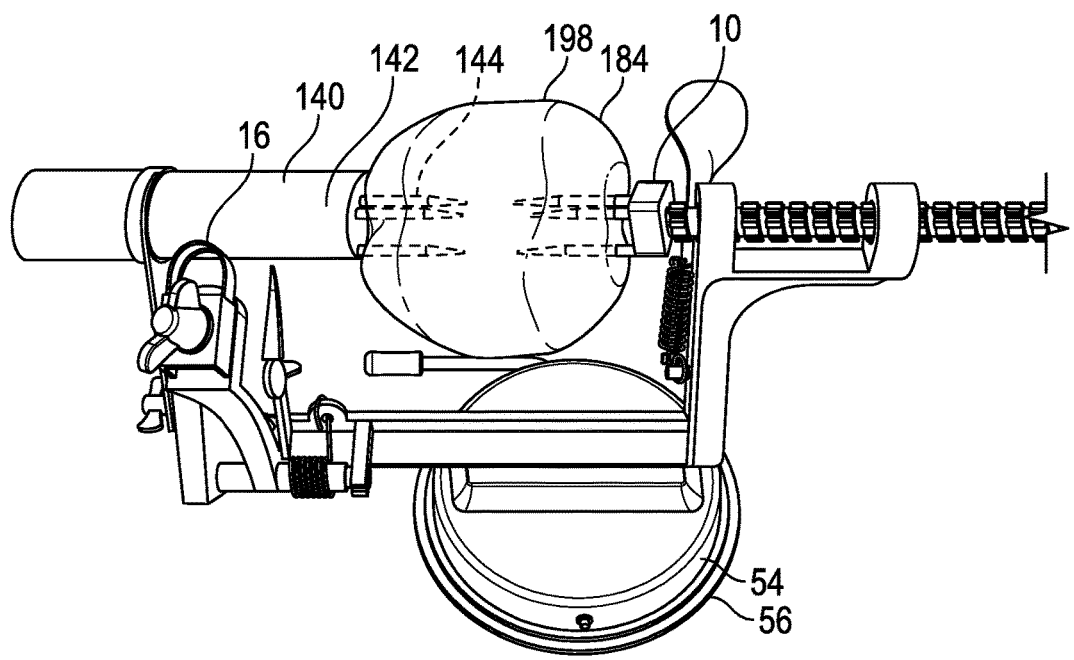
FIG. 9 is a side view of another implementation of a food processing system.
Figure 11:
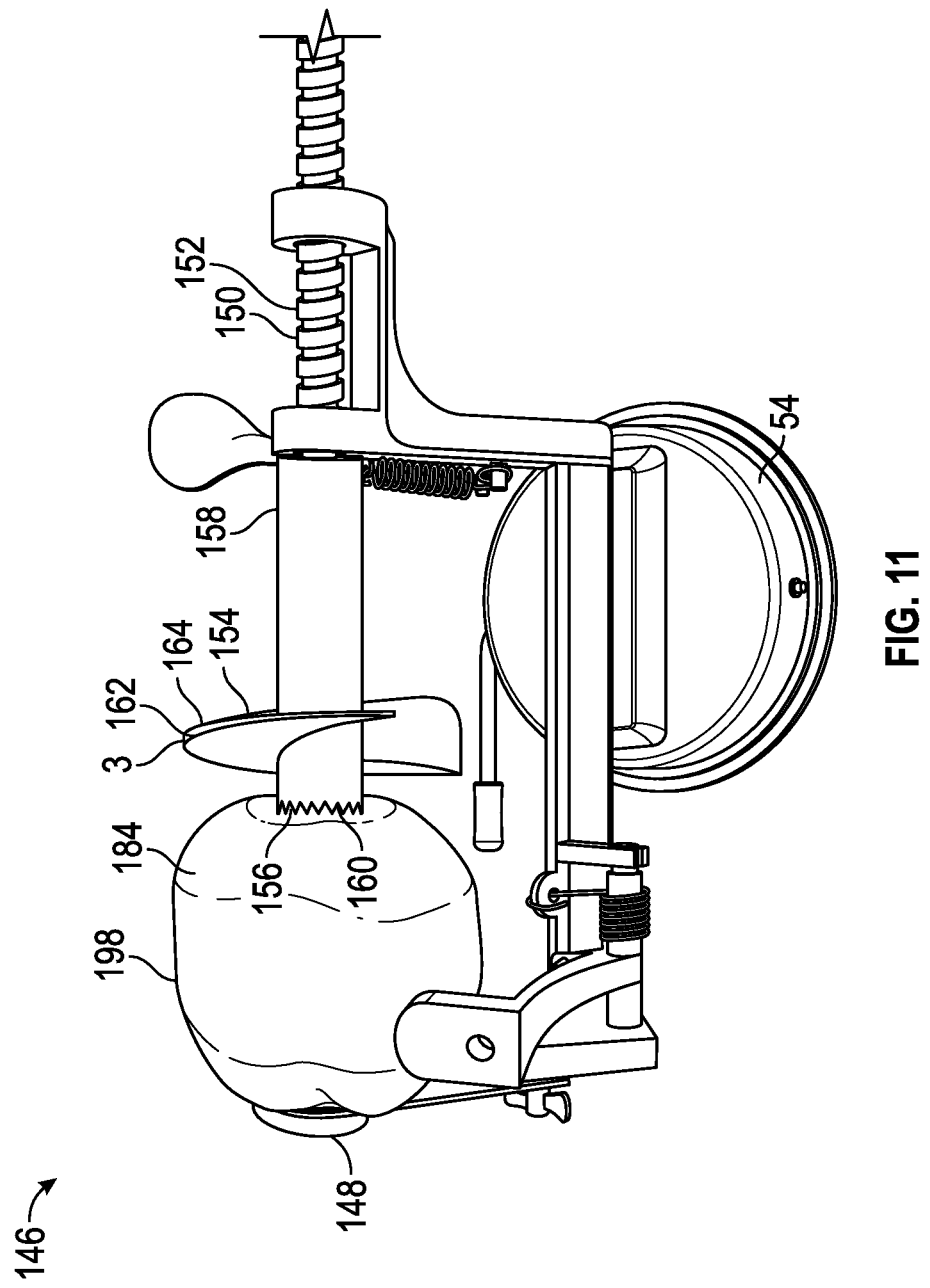
FIG. 11 is a side view of another implementation of a food processing system.
Figure 14:
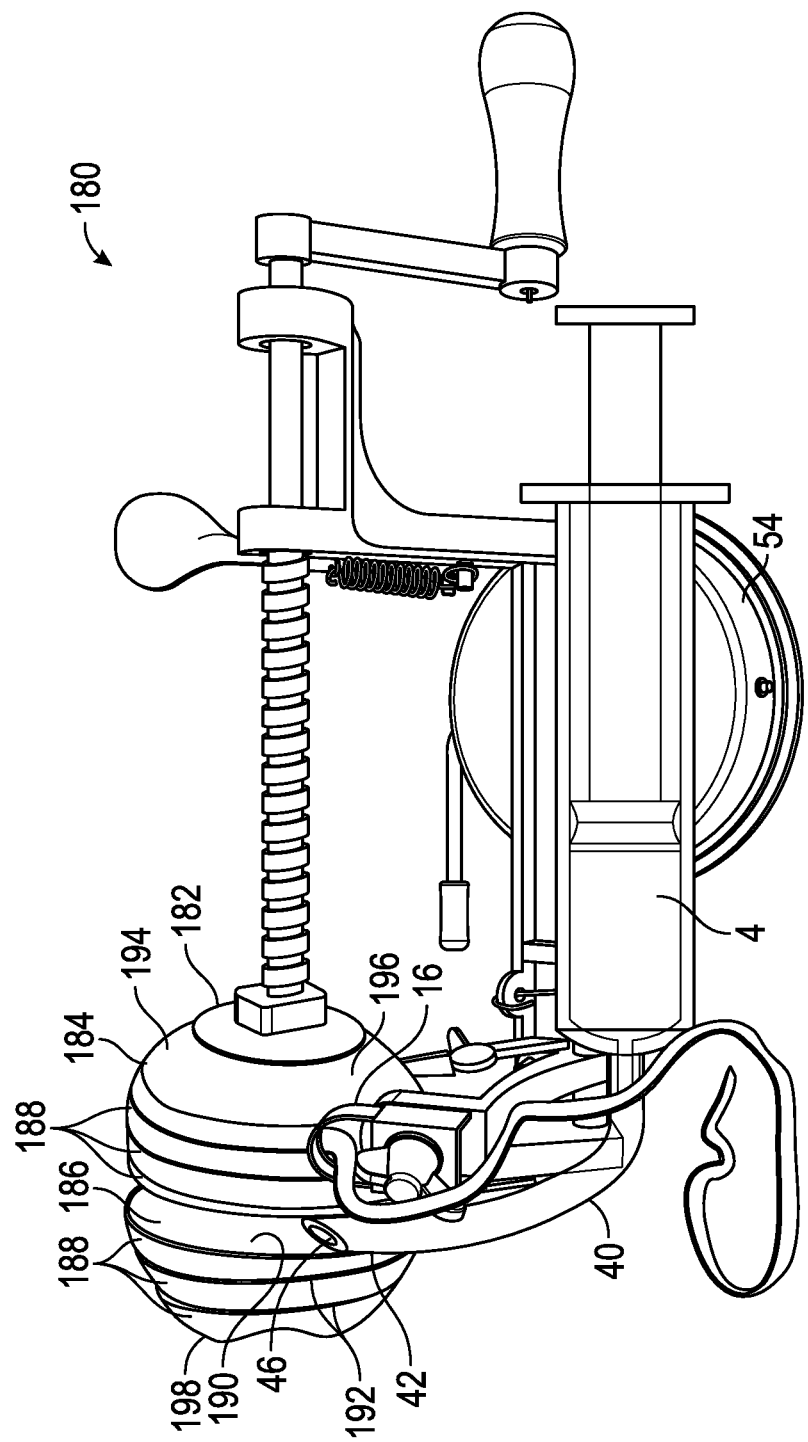
FIG. 14 is a side view of another implementation of a food processing system.

Referring to FIGS. 9, 11 and 14, which show different food processing systems but which share some elements in common with system 2, the food processors 3 are designed to process a food item 184 in some manner. In implementations other systems may have more or less food processors 3 than system 2, such as only one, two, four, five, six, or the like, any of which may be any food processor type disclosed herein. The food item 184 may be any item of food that can be processed by the food processor(s) 3. In implementations the food item 184 is a fruit or a vegetable, such that peeling and/or coring operations are useful to perform on it. For example, for an apple, it may be useful to peel, core and slice the apple, while it may be undesirable to core a potato so a potato may be only peeled and/or sliced. In other implementations the food item 184 could be something other than a fruit or vegetable so long as it can be sliced, or cored, or peeled, or have some other useful food processing operation performed on it using the system.

Referring back to FIGS. 1-2, a food holder 10 is used to hold the food item during processing. The food holder 10 shown in FIGS. 1-2 includes insertion pins 12 which are inserted into the food item to hold it. These insertion pins could be formed of metal or a rigid polymer material, by non-limiting example. The food holder 10 is coupled to a rotator 6 which rotates the food holder 10 and, accordingly, rotates the food item. A manual handle 8 is coupled to the rotator 6, though in implementations a motor could be coupled to the rotator 6 to operate it.

A linear displacer 14 is included in system 2 to move the food item along a direction that is perpendicular to the rotation of the food item or food holder. The rotator shown in FIGS. 1-2 is a narrow threaded cylinder having an axis. The rotation is substantially perpendicular or perpendicular to the axis and the linear displacement is substantially parallel or parallel with the axis. The linear displacer 14 and the rotator 6 of system 2 are both incorporated into the same element. In other implementations, however, they could be incorporated into separate elements and/or operate independently from one another. The helical threads of the cylindrical element serve both to rotate the food item and to linearly displace the food item as the manual handle is rotated and the threads of the rotator (and linear displacer) interact with mating threads of system 2. Naturally, as the rotation of the manual handle may be reversed, the rotation and linear displacement may also be reversed, so that with system 2 the food item may be rotated in one direction and moved towards the food processors 3 and rotated in the other direction and moved away from the food processors 3.

Although system 2 includes a rotator 6 and linear displacer 14 that are incorporated in the same element, in other systems the rotator and linear displacer could be incorporated into different elements and the movements accomplished by them may act independently or interdependently from one another. Likewise, although the food item itself is rotated and linearly displaced towards the food processors 3 when using system 2, with other systems, the food item could remain stable or fixed while the food processors rotate and/or move towards the food item. In either case, however, the food item is rotating and/or is being linearly displaced relative to the food processor(s).

Referring still to FIGS. 1-2 (and to FIG. 3, which is a different system but which includes the same peeler 16), the peeler 16 includes a blade 18 and an opening 20. The blade 18 in the implementation shown is a curved piece of metal, though it could be formed of other blade-forming materials, and is designed to peel a skin or outer layer of the food item off as the food item is rotated and the peel or skin of the food item simultaneously comes in contact with the peeler. A spring coupled to the peeler serves to maintain a force of the peeler towards the food item while allowing the peeler to move to accommodate the varying outer shape (diameter) of a single food item and of different food items. This spring is not numbered in the drawings but is perhaps best seen in a different system shown in FIG. 4, which includes the same spring configuration as system 2. The spring is a torsion spring coiled around a cylindrical rod that is parallel with the rotator, and a somewhat vertical arm to which the peeler is coupled with a wingnut is mounted to the cylindrical rod, to maintain tension so that the peeler is pressed towards the food item but allowed to rock towards and away from the food item along a direction perpendicular with the axis of the rotator to accommodate the shape and size of a food item, as indicated. In this manner the peeler can peel an entirety, or substantially an entirety, of a food item, even though the food item has a round or other shape, such as an apple or the like. The opening 20 of the peeler allows the peeled portion of the food item to pass therethrough during the peeling operation.

Figure 6:
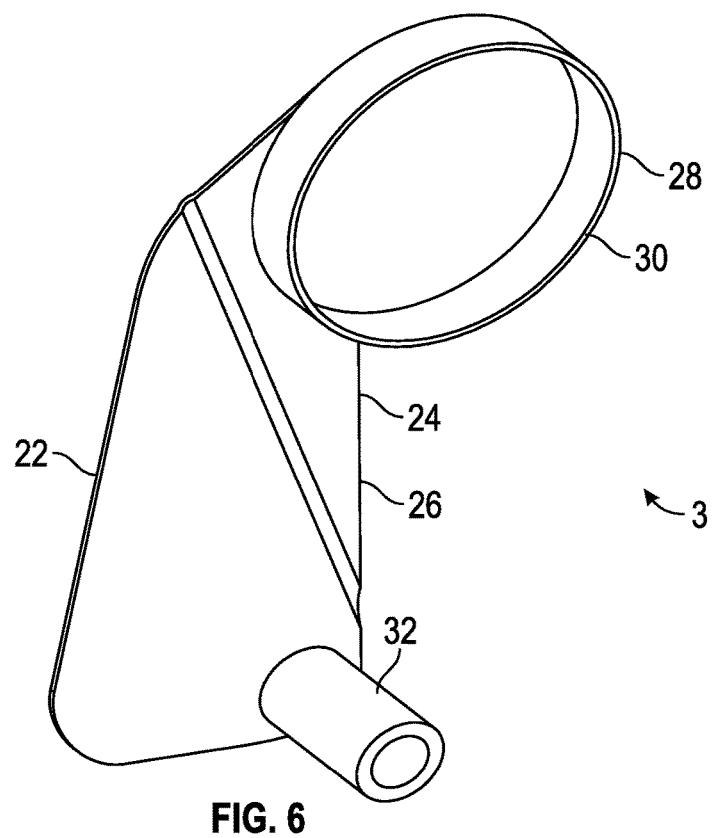
FIG. 6 is a front view of a coring and slicing member of the food processing system of FIG. 1.

Referring to FIGS. 1, 2 and 6, as indicated above, the coring and slicing member 22 includes a corer 28 and a slicer 24. The corer 28 and slicer 24 could, in other implementations, be separate elements and not combined in a single element. The corer 28 includes a circular blade 30 that cores the food item when the food item is rotated and moved towards the corer. The slicer 24 includes a straight blade 26 that slices the food item when the food item is rotated and moved towards the slicer 24. The coring and slicing member 22 may be formed of metal, ceramic, a rigid polymer, or any other material for forming a blade and may include an attachment member 32 to couple it with the rest of system 2.

An infuser 34 is coupled with the base 54 and is configured to infuse (inject/place) an infusion ingredient 4 (or a portion of the infusion ingredient 4) into the food item or, in other words, into a gap formed in the food item. As the food item is not shown in FIGS. 1-2, reference is made to FIG. 14 which shows a different system but one which includes the same infuser 34 to show a representative example of how this is accomplished. As the food item is being sliced, a gap 186 is formed between slices 188 of the food item 184. The slicer forms a spiral cut 192 in the food item, so that a number of "slices" can be considered to be formed—though in some senses the spiral cut food item becomes just a single "slice" wrapped into a spiral. Nevertheless, for the purposes of this disclosure, each portion of the food item separated from another portion by a cut, when viewed from any given viewing angle, is considered a separate "slice." The gap 186 exposes two opposing surfaces 190 at the cuts. As there are several "slices" when viewed from any given angle, there are also several "gaps" into which the infusion ingredient will be infused, each gap between a pair of slices. As can be seen in FIGS. 1 and 2, in implementations the infuser 34 may be coupled with, or may rest upon, a cradle.

In particular implementations, the infuser may be coupled to the slicer by being integrally formed as part of the slicer itself. In other implementations, the infuser may be coupled to the slider by being fixedly attached to the slicer. In various implementations, the infuser could be coupled to the blade of the slicer by being integrally or fixedly attached to the blade.

he infuser 34 of system 2 includes a tube 38, which is a hollow cylindrical tube 40, having a dispensing end 42 with an opening 46 to dispense the infusion ingredient 4. The dispensing end 42 of the tube 38 and the opening 46 are positioned to be within the gap 186 so that the infusion ingredient 4 may be dispensed at the gap 186 or, in other words, within the gap 186 and between surfaces 190. The tube itself in various implementations may assist in widening the gap present between slices of the food item. In other implementations, the gap is only present approximately at the location of the tube though the gap naturally "moves" through the food item due to the rotation and linear displacement of the food item relative to the food processor(s) 3. The gap is present at the specific location shown in the drawings, in various implementations, at least partly because this portion of the food item is just behind the slicer 24 relative to an unsliced portion 194 of the food item and the slicer itself assists in forming the gap. Accordingly, in various implementations, the placement of the tube directly behind the slicer allows the infusion ingredient to be infused between the slices or allows it to be infused more effectively between the slices because of the presence of the gap at that location.

The tube 38 could have a non-cylindrical shape and still operate in the same manner, in various implementations. The tube 38 has a taper 44 at the dispensing end 42. In implementations the taper 44 assists in allowing the infusion ingredient to be infused more effectively between the slices than a tube without a taper at the dispensing end. In various implementations of food processing systems, as in FIGS. 1-2, the taper faces towards the food item, while in the implementations in FIGS. 3A and 14 the taper faces away from the food item.

A reservoir 36 is included for holding a volume of the infusion ingredient 4. A discharger 48 discharges the infusion ingredient 4 from the reservoir through the tube 38 and in between the slices of the food item. In system 2 a syringe 52 is used as a reservoir while the discharger is a piston 50 therein. In system 2, therefore, operation of the infuser 34 is accomplished manually, i.e., a user manually pushes the piston 50 to discharge the infusion ingredient while the manual handle 8 is being rotated. In other systems the operation of the infuser 34 may be by motor or gears which couple the operation of the infuser 34 with the manual handle 8 so that the infuser does not need to be directly operated manually in order to infuse the infusion ingredient into the gap.

Figure 3A:
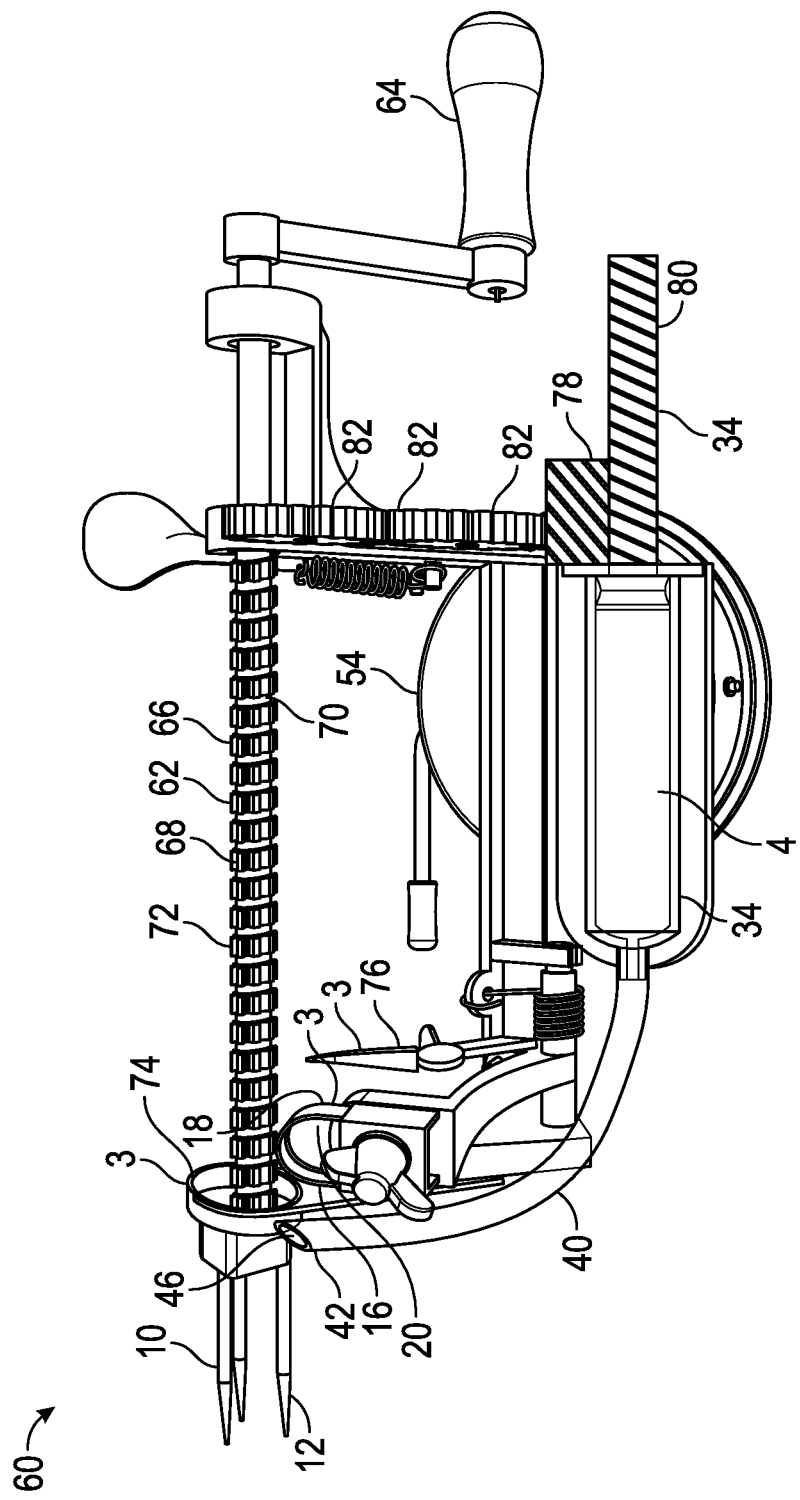
FIG. 3A is a side view of another implementation of a food processing system.
Figure 3B:
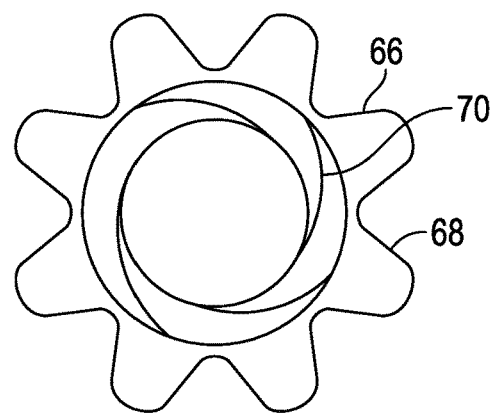
FIG. 3B is a cross section view of a rotator of the food processing system of FIG. 3A.
Figure 3C:
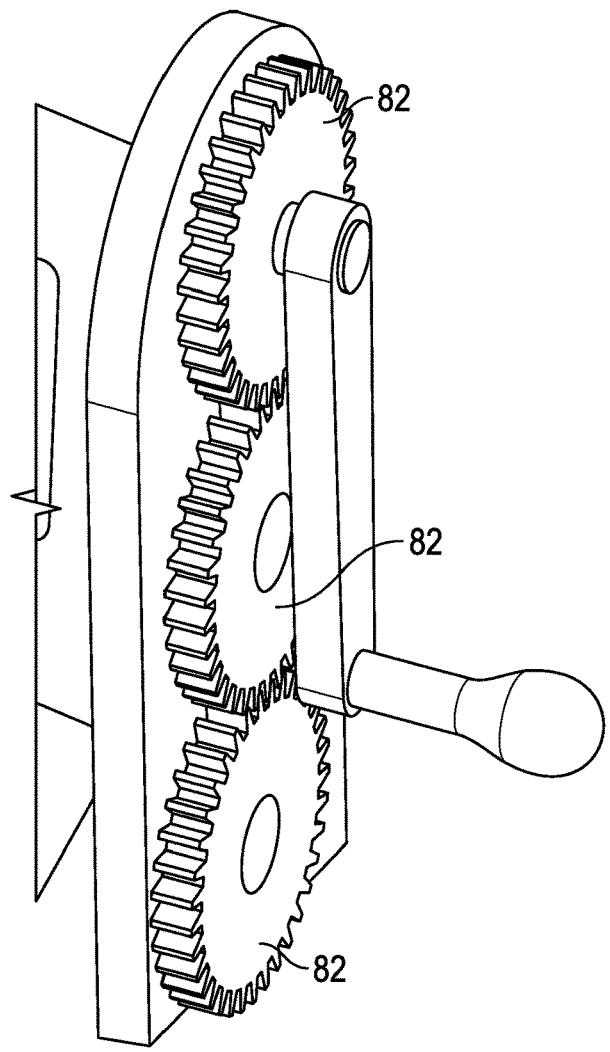
FIG. 3C is a perspective view of a plurality of gears of the food processing system of FIG. 3A.

FIGS. 3A-3C show a version of a food processing system (system) 60 which is in some ways similar to system 2 and in some ways different. A rotator 62 is included which is similar to rotator 6 except, at least, that there are gear teeth 68 formed along the outer surface of rotator 62, as seen more clearly in the cross section view of the rotator in FIG. 3B. As the manual handle 64 is turned to rotate the rotator 62 and the food item, the threads 70 cause the food item to be linearly displaced (and thus linear displacer 72 is integrally formed with rotator 62 similar to system 2). While this rotation and linear displacement are occurring, the gear teeth 68 interact with a plurality of mated gears 82, as more clearly seen in FIGS. 3A and 3C, which are coupled with a worm gear 78 that engages gear rack 80 to translate a rotational force/motion into a linear force/movement at a 90 degree angle to the rotational force/movement and drive the piston to operate the infuser. In this way, the rotator 62 becomes is a dual-drive auger 66 and the operation of the infuser is integrated with the operation of the rotator so that the rotation of the manual handle 64 causes the simultaneous rotation of the food item, the linear displacement of the food item, and the infusion of the food item with the infuser. As indicated with other systems, the operation of the infuser, rotator and/or linear displacer could in some implementations be motorized and/or otherwise automated.

System 60 includes a corer 74 and a slicer 76, but in system 60 the corer and slicer are separate and not integrally formed into a single element as opposed to the coring and slicing member 22 of system 2. The slicer 76 is also positioned in a slightly different place, it may be seen in FIG. 3A positioned slightly before or proximate the same plane in which the peeler 16 is located, which plane is perpendicular to the axis of the rotator 62. As indicated previously, the location of the dispensing end of the tube of the infuser relative to the slicer can be important in order to deposit the infusion ingredient as desired between slices of the food item. The slicer 76 and or the tube 38 may accordingly be repositioned if needed to achieve optimum delivery of the infusion ingredient between slices of the food item. The slicer 76 may therefore be coupled with the base 54 using a sliding element that allows it to slide side to side along a direction parallel with the axis of the rotator, and in some implementations its position in a plane perpendicular to this axis may also be adjusted. The tube may be formed of a flexible material such as a flexible polymer, which may allow it to be repositioned as desired and fixed or temporarily fixed at a desired position such as with screws, magnets, an adhesive or tape, and the like.

In implementations of food processing systems disclosed herein the rotator includes a mechanism so that, when the food holder is linearly displaced at a terminal end towards (and/or past) the food processor(s), continued rotation of the rotating handle in the same rotation direction then reverses the linear displacement so that the food holder is then moved in the opposite direction and away from the food processor(s). This may occur, for example, once a key of the rotator has reached a vertical slot. This reversing of the rotator may withdraw the insertion pins from the food item (which may automatically drop the food item) and may speed processing so that a user does not need to reverse rotation of the handle in order to draw the food holder back into position to place another food item thereon. It may also be useful in motorized versions so that a motor does not need to reverse directions, which may extend the life of the motor and otherwise reduce movement, shaking, noise, or the like of the food processing system. A food processing system may be designed so that, while the food holder is being retracted in this manner away from the food processor(s), the food holder is no longer rotating, but is only being displaced linearly. This may be accomplished, by non-limiting example, with the use of a linear actuator such as a ball screw, a roller screw, or a similar device that is operational only in the reverse direction.

Figure 4:
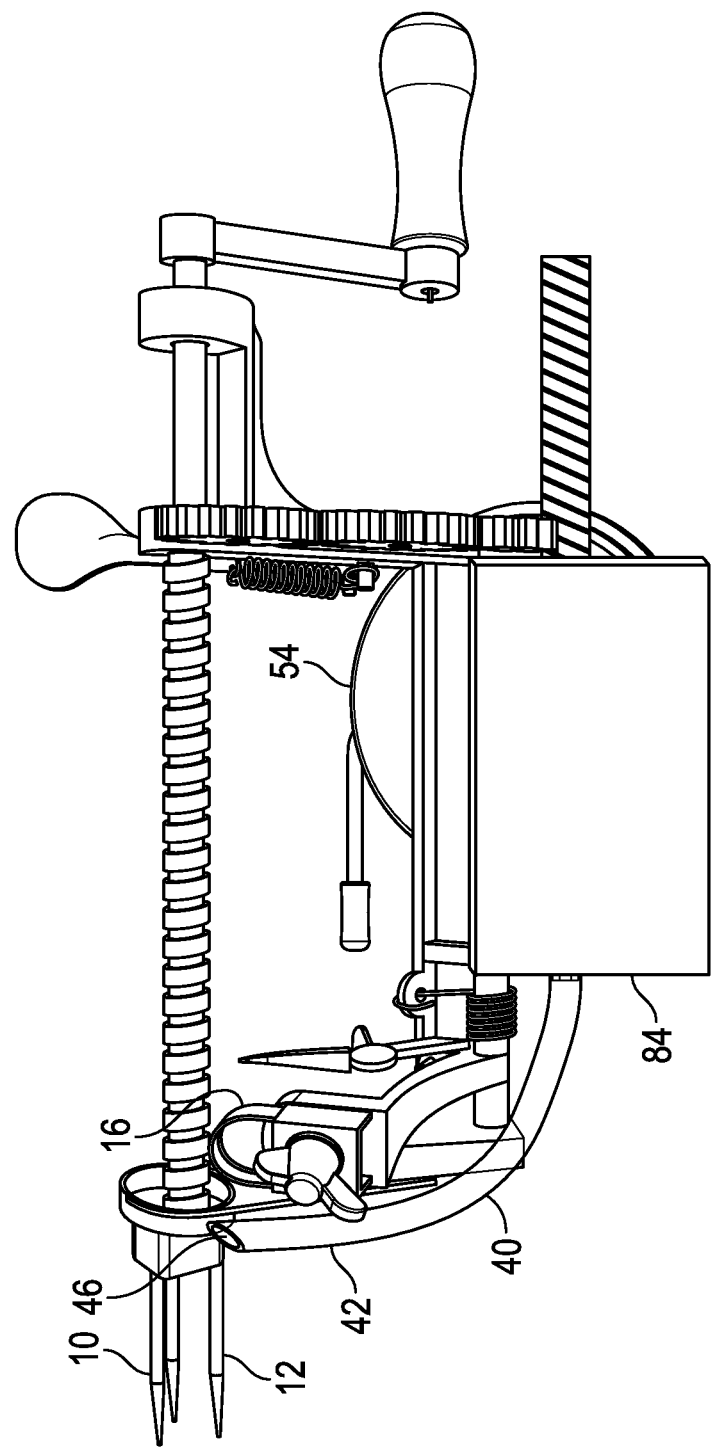
FIG. 4 is a side view of another implementation of a food processing system.

FIG. 4 shows a food processing system which includes an infuser 84 intended to represent any type of infuser which may be operated with any type of linear displacement of some element within or coupled to the infuser (such as with a gear rack, pneumatic piston, or any other element), any type of rotational movement of some element within or coupled to the infuser, an introduction of air into the infuser such as with a pump, the use of magnetic forces, a belt, a friction drive, motorized elements, electronic elements, hydraulic elements, and any other type of movement or force. In short, any type of mechanical movement and/or force may be translated, in myriad ways, into an operation of the infuser to infuse the infusion ingredient within slices of the food item. In implementations the infuser 84 is a removable vat that can be easily replaced when empty with a new vat that is filled with the infusion ingredient.

Figure 5:
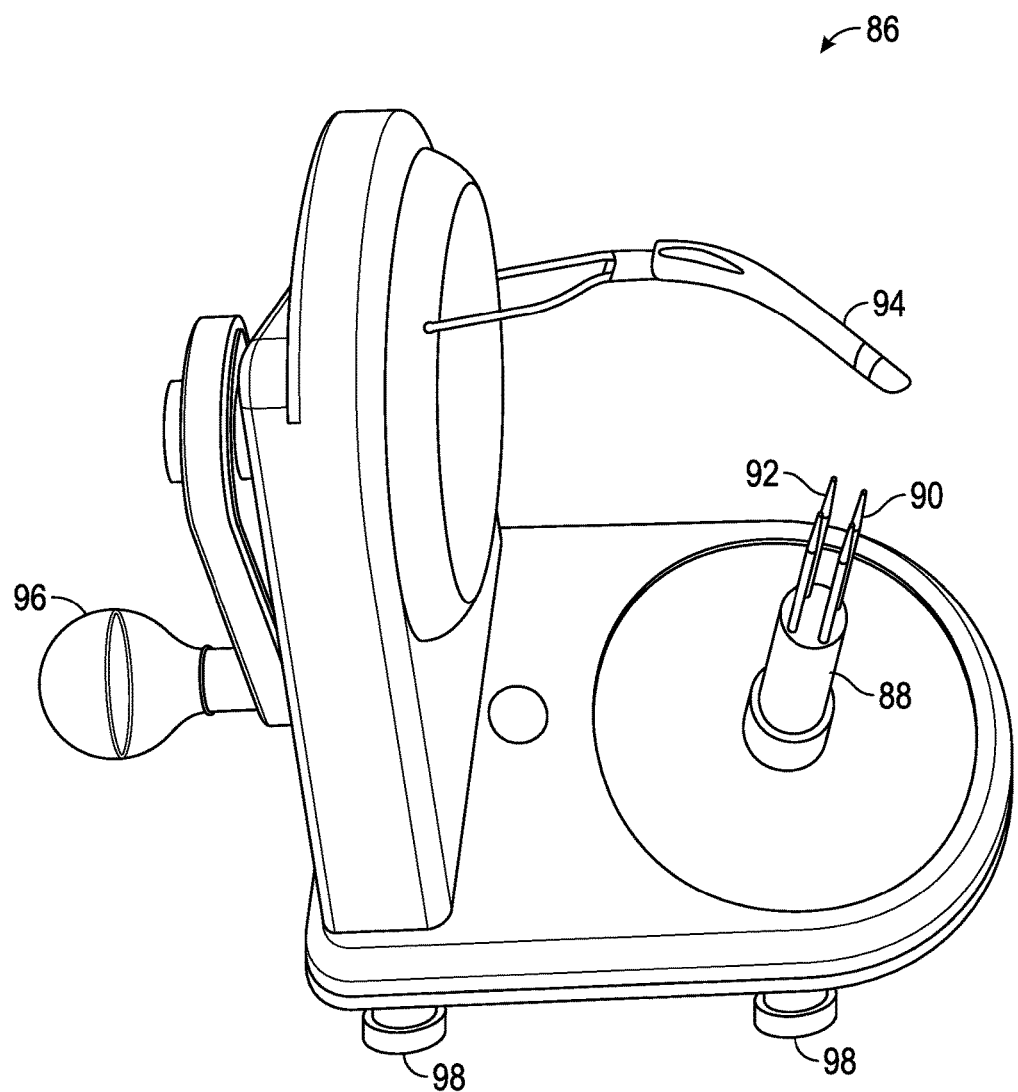
FIG. 5 is a top perspective view of another implementation of a food processing system.

Referring to FIG. 5, in implementations a food processing system (system) 86 may be designed so that the axis of the rotator 88 is vertical or, in other words, perpendicular to or substantially perpendicular with a flat surface upon which a base 98 is configured to rest. System 86 includes a food holder 90 similar to other food holders described herein in that it has insertion pins 92 designed to be inserted into the food item. An attachment member 94 may have a food processor 3 attached thereto, such as a corer, slicer, peeler, and/or infuser to process the food item. The attachment member 94 may be stationary and the system 86 may include gears so that rotation of the manual handle 96 rotates the rotator 88 and also linearly displaces the rotator upwards along a direction parallel to an axis of rotation of the rotator 88 to move the food item towards and past the food processor 3. In other implementations, the rotator may rotate but may not move linearly upwards and instead the attachment member 94 may be configured to move downwards (and return upwards) along a direction parallel with the axis of rotation of the rotator so that the food item rotates but is linearly stationary while it is being processed by the food processor 3.

Referring now momentarily to FIG. 9, in various implementations, a food processing system may include a second food holder 140 which may assist in stabilizing the food item while it is being processed and may result in a more uniform spiral slice throughout, more uniform coring, and/or more uniform peeling (or more uniformity in some other food processing method). The second food holder 140 in the implementation shown is a cylindrical shaft 142 which includes insertion pins 144 for insertion into one side of the food item while the insertion pins of the food holder attached to the rotator are inserted into the other side of the food item. The second food holder 140 is not required to interact with insertion pins of the primary food holder that is attached to the rotator and is not required to be pre-inserted into the food item at a required plane, as is the case with secondary food holders of traditional food processing systems. It is also removable from the food item at an earlier stage in the food processing process and does not damage the core of the food item, as is the case with secondary food holders of traditional food processing systems (the latter is useful if the food item has a salvageable core, such as when the food item is a potato).

Figure 7:
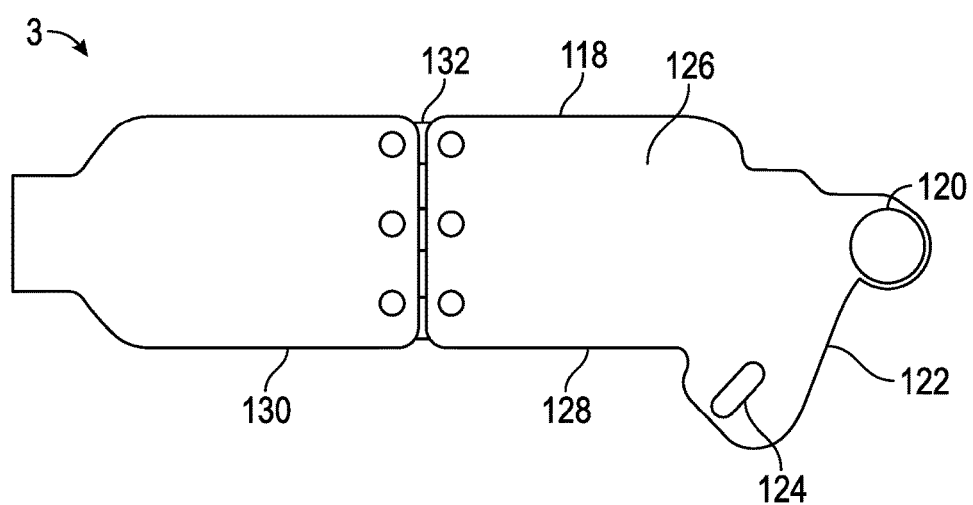
FIG. 7 is a top view of a coring, slicing and infusing member of the food processing system of FIG. 10 in an open configuration.
Figure 8:
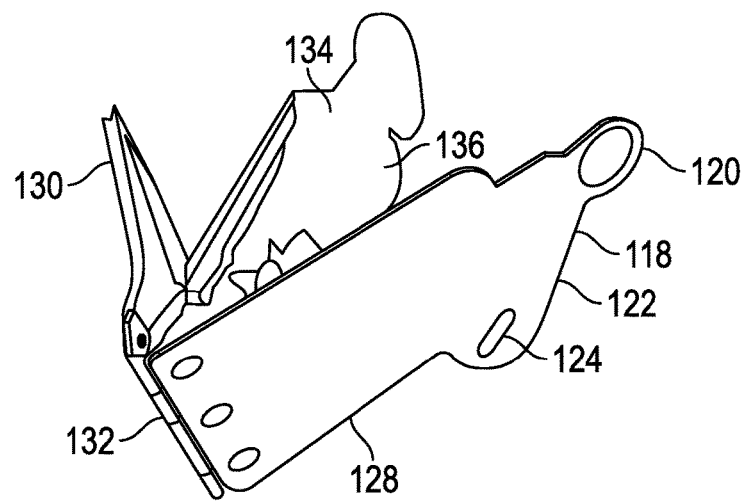
FIG. 8 is a side perspective view of the coring, slicing and infusing member of FIG. 7 with an infusion packet being placed therein.
Figure 10:
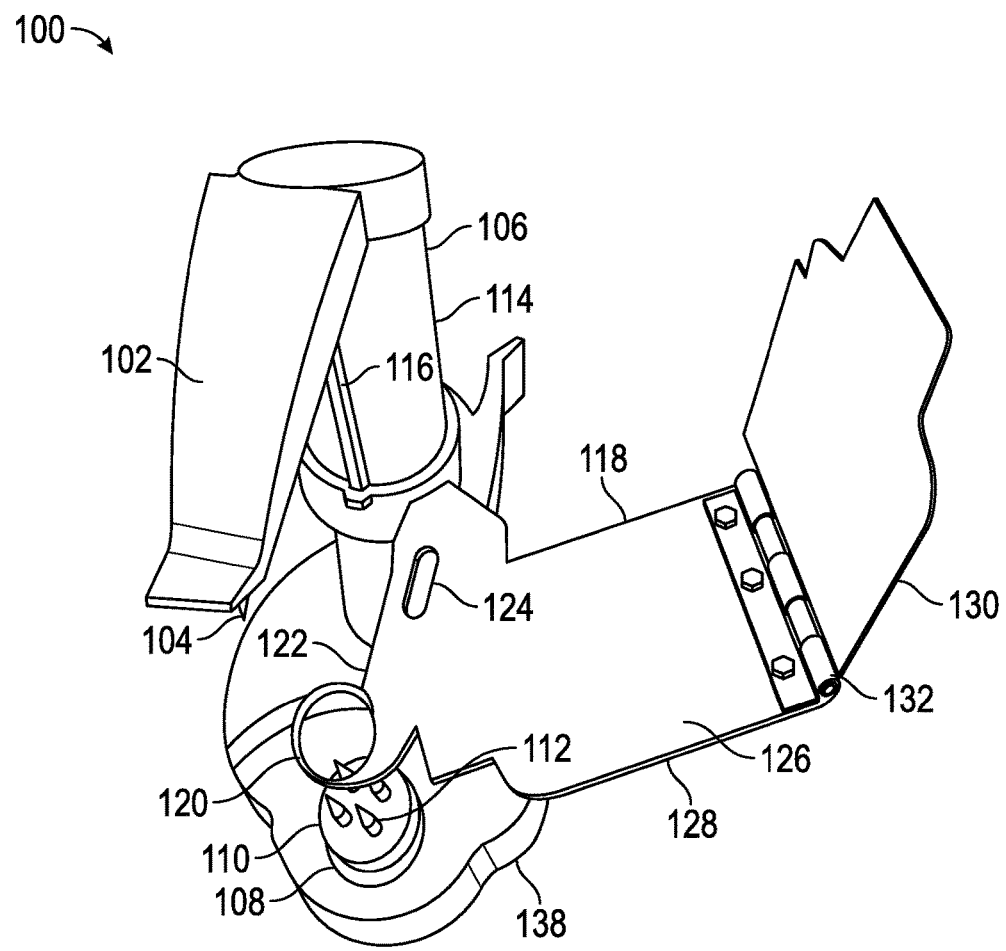
FIG. 10 is a top perspective view of another implementation of a food processing system.

Referring now to FIGS. 7, 8 and 10, in implementations a food processing system (system) 100 includes a first food holder 102 having a positioning pin 104 configured to be inserted into one end of the food item while a second food holder 108 coupled with a rotator 110 includes insertion pins 112 to be inserted into the other end of the food item. The linear displacer 114 in this implementation includes a shaft 106 having a track 116, with the coring, slicing and infusing member 118 moving up and down the shaft along a direction parallel with an axis of rotation of the rotator while the track 116 serves to prevent the coring, slicing and infusing member 118 from rotating about an axis of the shaft 106. In some implementations the coring, slicing and infusing member 118 is manually slid up and down the shaft 106, while in other implementations this movement is automated such as with gears or is motorized. System 100 includes a base 138 configured to rest on a flat surface. Base 138, along with all other bases disclosed herein for any implementations of food processing systems, may be configured to attach to a surface such as with suction elements, a clamp, other attachment mechanisms disclosed herein, and the like. A vertical system such as system 100 wherein a positioning pin 104 is used and the food item rotates while the food processors 3 move linearly may in implementations be more useful for some food items than others, such as more useful for pears and potatoes than for apples, because of the shape and/or texture of the food item (including the texture of the outer peel/surface and/or the inner texture).

The coring, slicing and infusing member 118 includes a corer 120, a slicer 122 and an infuser 124. The corer 120 is similar to other corers described herein and includes a circular blade with an opening therethrough. The slicer 122 includes a straight sharp edge of a first panel 128. The infuser 124 includes an opening in the first panel 128. The first panel 128 is coupled with a second panel 130 using a hinge 132 and the two panels may be used to squeeze an infusion ingredient from an infusion packet 134 which is formed of a flexible pouch 136. The infusion packet 134 has a tear-off portion at its top which may be torn or cut with a blade or scissors and may include, by non-limiting example, a flavoring in the form of a gel or syrup. Once the top portion of the infusion packet is torn or cut and the infusion packet is placed between the two panels, the panels may be squeezed together upon the hinge so that, while the food item is being cored and sliced during rotation of the food item, the infusion ingredient is being dispensed into a gap formed between slices of the food item through the infuser 124 immediately after or behind the slicing operation.

The inside portion of the coring, slicing and infusing member 118 between the first panel 128 and second panel 130 is thus a reservoir 126 for holding the infusion ingredient. The pressing of the two panels together to squeeze out the infusion ingredient may be done manually or the pressing may be partially or fully automated through gears, a motor, and the like. In various implementations, a pneumatic pressing element or rolling element (rolling from a closed to an open end of the infusion packet 134) could be used to press the two panels together to squeeze out the infusion ingredient. In some implementations the second panel 130 could be excluded and a pneumatic pressing element or rolling element (again rolling from a closed to an open end of the infusion packet 134) may be pressed directly onto the infusion packet to expel the contents thereof. In implementations the second panel 130 may dispense the infusion ingredient through the force of gravity alone which may tend to clamp the second panel 130 downwards upon the infusion packet. Other methods may use air pressure, vacuum, paired rollers, and so forth to expel the infusion ingredients from the infusion packet. In implementations the coring, slicing and infusing member 118 may be placed more vertically (so that the open end of the infusion packet faces downwards) to dispense a dry infusion ingredient such as solid sugar, graham cracker crumbs, sprinkles, and so forth.

Referring to FIG. 11, a food processing system (system) 146 has some elements in common with other food processing systems disclosed herein and some different elements. The peeler 16 in this case has been removed and the corer has been replaced with a food holder 148 that holds one side of a food item and which may or may not include insertion pins. A coring and slicing member 154 coupled with the combined rotator 150 and linear displacer 152 includes a corer 156, which is a hollow shaft 158 having teeth 160, and further includes a slicer 162 which is a helical blade 164. In this implementation the food item remains stationary while the coring and slicing member 154 rotates and moves towards the food item 184 (and through the food item 184 towards the food holder 148) to slice and to core the food item, which in the representative example of FIG. 11 is an apple 198.

As can be seen from FIG. 11, system 146 may be formed by starting with system 2 and removing and/or replacing some elements. The same can be said of other systems disclosed herein: system 60 may be formed by removing and/or replacing some elements of system 2 and/or system 146 and/or system 180, and vice versa. Other variations of food processing systems may be formed by adding, removing or replacing elements of systems described herein, such as to form a system that only does one, or two, or three, or all four of the coring, slicing, peeling, and infusion operations (and/or any other food processing operations), or moves the food processor(s) instead of the food item, or moves the food item instead of the food processor(s), or moves the food item and the food processor(s), or is a horizontal unit with horizontal linear displacement, or a vertical unit with vertical linear displacement, or is motorized or automated with gears and the like, and so forth.

Figure 12:
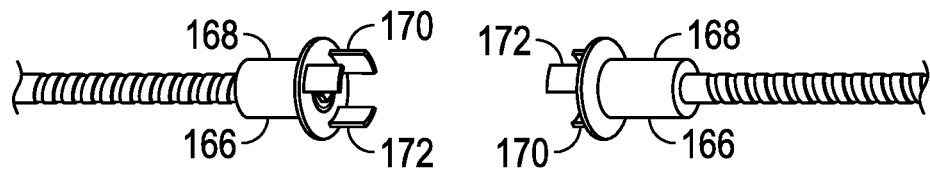
FIG. 12 is a side view of a gripper of a food processing system.

Referring to FIG. 12, a gripper 166 could be used with a food processing system to hold the food item instead of a food holder with insertion pins. The gripper includes gripping members 170 which are projections 172, but which are shorter than the projection pins and do not insert as far into the food item. Each gripper 166 also includes a coupler 168 for coupling to a rotator. In implementations there may be two grippers 166 to couple into opposite sides of the food item and each gripper may be coupled to a threaded cylinder so that they rotate together with the food item during the food processing. In some implementations the two grippers may be rotated, such as using two different rotating handles, or one rotating handle coupled with gears to both shafts, or a motor coupled to both, and operated in a mode which brings the grippers nearer one another, to insert the projections 172 of the grippers into the food item, while the reverse process may remove them from the food item.

Figure 13:
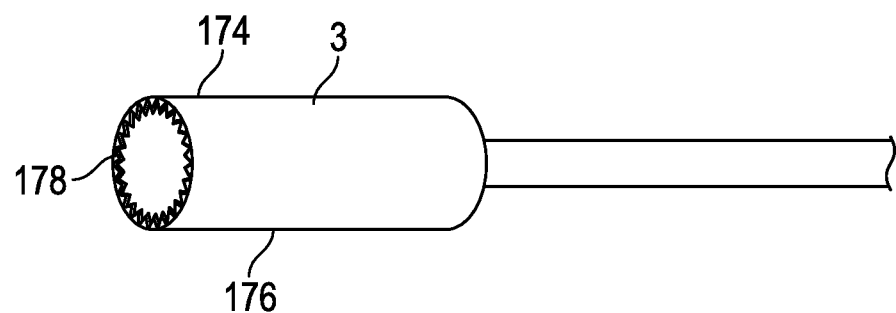
FIG. 13 is a side view of a corer of a food processing system.

Referring to FIG. 13, in implementations a food processing system may include a corer 174, which includes a hollow shaft 176 having teeth 178 and which may be coupled to a rotator, for example to perform a coring-only operation, or a coring in combination with another food processing methods such as in combination with any other food processor 3.

Food processing system 180 of FIG. 14 includes some elements in common with other food processing systems disclosed herein and some elements that are different. System 180 has been referred to earlier to show a representative example of how the infuser may infuse the infusion ingredient 4 into a gap 186 formed between slices 188 of the food item 184. System 180 also includes a retention member 182 which couples to an outer surface 196 of the food item. Retention member 182 is a member that extends radially outward from an axis of the rotator and in implementations has a diameter perpendicular to that axis that is greater than a greatest diameter of the corer perpendicular to the axis. The retention member 182 is also somewhat cup-shaped and so receives an end of the food item within an interior of the cup shape.

Retention member 182 may help to hold the food item in place so that the sliced spiral of food item that results from the cutting operation does not tear but, instead, forms one single continuous spiral slice. As the unsliced portion 194 of the food item gets smaller and smaller during a slicing step (and about when, or after, the coring process is complete) it sometimes becomes more likely that the food item will tear and form, instead of one continual spiral in the shape of the original food item, a plurality of smaller spirals each formed from broken sections of the original food item. This may be caused partly because, traditionally, the rotational force of the food item is being driven by the insertion pins which are within the core, so that once the core is close to being fully cut, or once it is cut, there is no longer as much, or any, rotational force to continue slicing the food item. The traditional system may thus not complete its spiral cut cycle. Retention member 182 distributes and equalizes the rotational force inside and outside of the core and corer, and thus assists the system to form a single continuous spiral. Retention member 182 may be parabolic in shape, in implementations, though it may take on other shapes, and it may contact the outer surface of the food item when the insertion pins are inserted into the food item.

Figure 15:
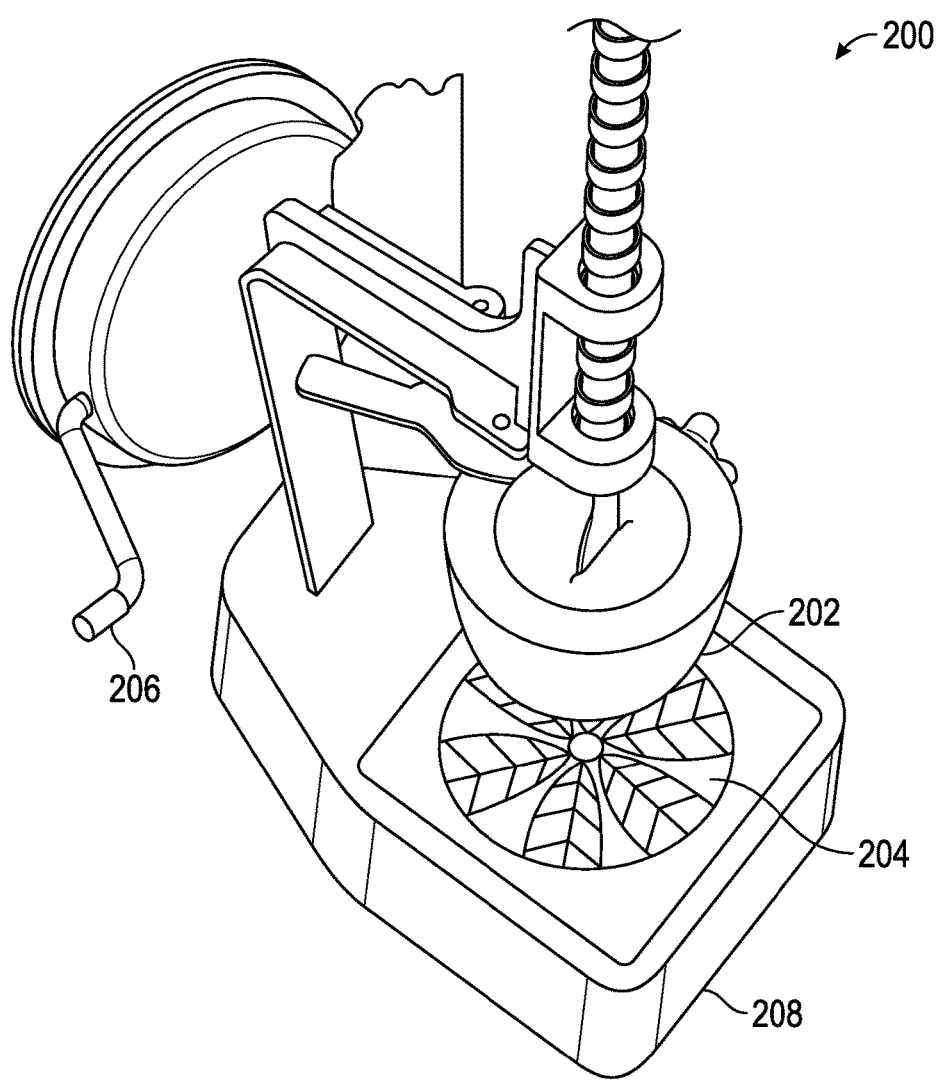
FIG. 15 is a top perspective view of another implementation of a food processing system in a first configuration.
Figure 16:
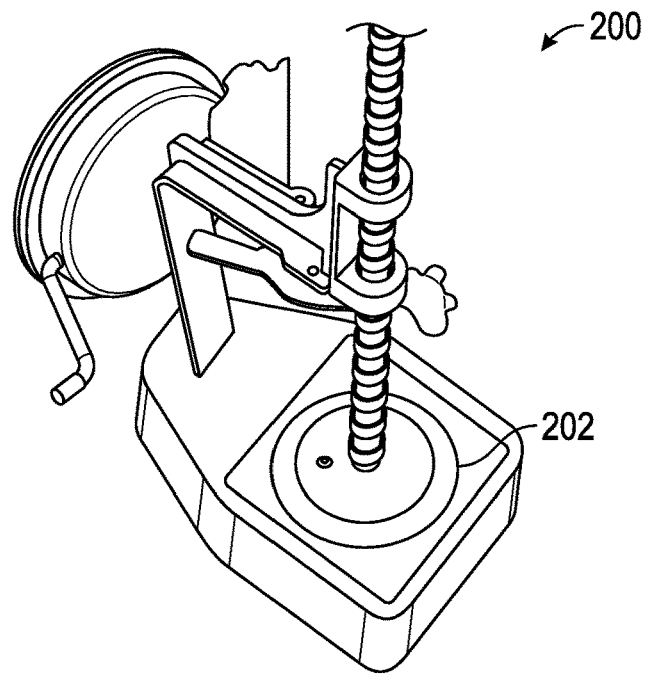
FIG. 16. is a top perspective view of the food processing system of FIG. 15 in a second configuration.

FIG. 15 shows a food processing system (system) 200 which includes a rotator, a manual handle 206, and a base 208 configured to rest on or be coupled with a flat surface. Food processing system 200 does not slice, peel, or core a food item, however, but instead forms a malleable food item into a desired shape by pressing it into a mold 204 with a plunger 202. The mold shown in FIG. 15, for example, has a design of leaves in a radial configuration. A piece of dough may be placed in the mold and the plunger may be pressed down into it, as shown in FIG. 16, and then excess dough or other food material may be trimmed from the outer edges of the mold/plunger. The plunger may then be retracted and a cavity will be left where the plunger sat, such that a food item may be placed inside the molded material.

By non-limiting example, an apple that has been cored, sliced, peeled and infused may be cut in half, so that one half of the full spiral is placed, rounded end/side downwards, into a cavity formed into a dough after the plunger has been retracted. The flat end/side may then be topped with a flat circular piece of dough, and this may be cooked to form a miniature apple pie with the infusion ingredient therein between slices of the apple within the miniature apple pie. Another example includes placing a moldable candy material, such as a viscous sugary liquid that hardens as it dries, into a mold. Cellophane wrap is then placed over the top of the mold or, alternatively, covering the plunger, and the plunger is extended into the mold. Excess viscous liquid may be removed similar to the dough described above. The plunger is retracted and, before the liquid has a chance to settle at the bottom, the cellophane wrap is removed from the cavity (if it was placed in the cavity) and the cavity is filled with a food, such as half of a cored, sliced, peeled and infused apple, as described above. The flat side may then be covered with more of the viscous liquid, and allowed to dry, and after drying the result will be a dessert with a candy coating that has a design on it and is decorative due to the molding process. In some implementations such a candy shell may need to be cooked to some degree to harden it, and in those instances the base may be removable and may be configured to be usable in an oven, a microwave, or the like.

Figure 17:
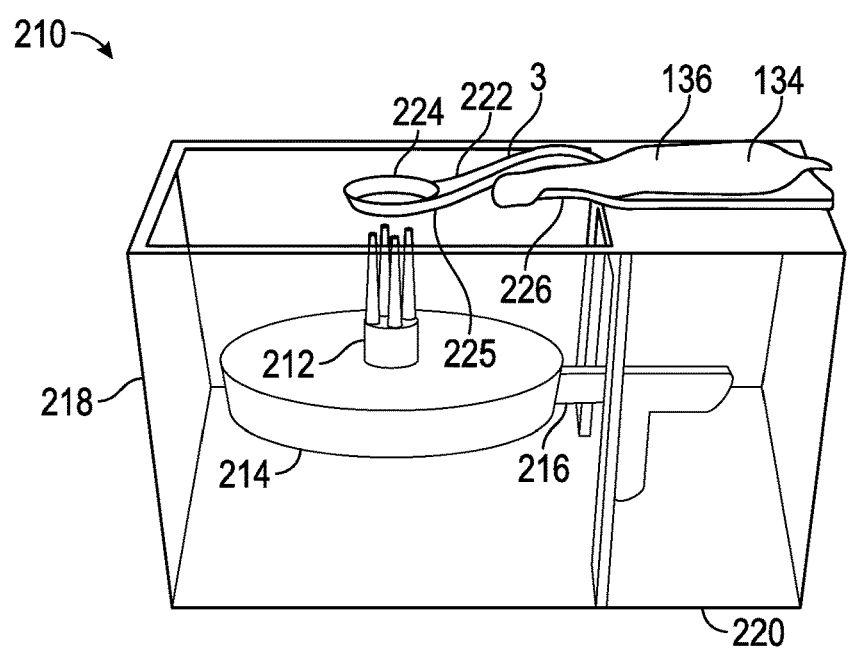
FIG. 17 is a side perspective view of another implementation of a food processing system.

FIG. 17 shows a food processing system (system) 210 that includes a rotator 212 coupled to a housing 214. The rotator 212 rotates while the entire housing 214 moves upwards (and retracts downwards in reverse) using the linear displacer 216. A peeler may also be included, and the container 218 may be used to collect the peelings and/or to prevent a mess outside the container 218 during normal slicing, coring, infusing, and so forth. A coring, slicing and infusing member 222 is shown which includes a corer 224, a slicer 225 and an infusion packet holder 226. The infusion packet 134 may be pressed down on or rolled with a rolling item, or clamped down on with a panel as described with respect to other infusing elements herein (or otherwise dispensed as described with respect to other infusion packets herein), to dispense the infusion ingredient within the infusion packet into a gap formed between slices of the food item during processing of the food item. The system 210 includes a base 220 for resting on a flat surface which may include any of the coupling mechanisms described with respect to other bases herein.

In versions of system 210 the coring, slicing and infusing member 222 is fixed during operation but is swingable into and out of position prior to and after operation, and it may or may not be attached to the infusion packet. By being able to swing the coring, slicing and infusing member 222 out of the way while the food item is placed on the insertion pins of the rotator 212 the device is able to be shortened by about 30% compared with system 2 and with traditional food processing systems. The food item thus rotates along an axis of rotation of the rotator. In implementations the housing and therefore the rotator are also moveable in a plane perpendicular with the axis of rotation of the rotator, both laterally and longitudinally, such as to position the food item prior to processing it. The rotation direction and movement along the direction parallel with the axis of rotation may be reversed. The container may be excluded in some implementations, or the top and sidewalls thereof may be excluded, so that there is an open air presentation similar to system 100.

The infusion ingredient 4 may include any comestible ingredient such as, by non-limiting example, a food coloring, a solid, a powder, a flowable solid, a flowable liquid, a gel, a liquid, a flavored ingredient, a non-flavored ingredient, a sugar, a caramel, a paste, a foamy or creamy filling substance, sprinkles, crumbs, and any other material capable of being controllably dispensed.

As described to some extent already, whether it is the food item itself that rotates, or the food processor(s) (whether peeler, slicer, corer and/or infuser), rotation of either is rotation of the food item relative to the food processor(s). Likewise, whether it is the food item that is linearly displaced, or the food processor(s) (whether peeler, slicer, corer and/or infuser) that is linearly displaced, linear displacement of either is linear displacement of the food item relative to the food processor(s).

While the food processing systems disclosed herein are capable of performing various food processing steps simultaneously, such as peeling, coring, slicing, and/or infusing, they are also capable of performing multiple operations in series. For example, a system may be used for peeling a food item and then a corer may be added to the system (and the peeler optionally removed) and the food item could then be cored, and so forth.

The food processing systems disclosed herein may be used for the preparation of food items, such as fruits, vegetables, or other food items, to be eaten fresh, cooked, candied, dehydrated, and so forth. Manual and motorized versions of food processing systems may include computer controls for blade operation and/or infusion rates and the like.

Any of the food processors disclosed herein, such as peelers, corers, slicers, infusers, and so forth, may include quick-release and quick-attach mechanisms such that they can be removed, replaced, interchanged with other elements, and so forth, to enable easier and quicker switching from one version of a food processing system to another version.

A traditional food processor may be modified by incorporating or replacing a coring and slicing member 22 with one that has an infuser integrated therewith. Thus a traditional food processor may be retrofit to perform an infusion operation. For example, the new or retrofitted food processor may include a food processor similar to coring and slicing member 22 but with one or more fluid channels or fluid tunnels formed within the device (for instance in or within or below the planar flat surface of the device) and these may be in fluid communication with the infuser, such as by coupling a tube of the infuser to a tube receiver in communication with these channels or tunnels, so that the infusion ingredient may be dispensed through the channel(s) or tunnel(s) into the gap(s) between slices of the food item while the food item is being sliced.

In implementations a coring, slicing and infusing member 118 could be used to hold a guide that would direct a wrapping of some sort, such as by non-limiting example a ribbon of caramel, on an outside of the food item.

In implementations multiple infusers and/or multiple tubes may be used to work individually or simultaneously to infuse multiple infusion ingredients. These may combine to couple to a single dispensing end, or there may be multiple dispensing ends located within or near a single gap to dispense the infusion ingredients, or there may be multiple dispensing ends located within or near different gaps to dispense the infusion ingredients into different gaps, and so forth. These may dispense liquid or gel infusion ingredients as well as dry infusion ingredients into the same food item. Any of the infusers described herein may be positioned in a way so that they will infuse a dry or solid infusion ingredient, such as by positioning a reservoir and/or tube above the food item so the dry infusion ingredient may be more easily infused into a gap. Mechanisms for infusing dry elements may be different than those for infusing liquid element and may include, for instance, an auger conveyor (which may allow the tube and/or reservoir to remain in the positions shown in the drawings and/or the tube may be replaced with an auger conveyor), and or other mechanisms. One or more infusers may be positioned to deposit a coating or ribbon of an infusion ingredient on an exterior of the food item.

In implementations any food processing system described herein with food processors 3 may have the food processors couplable to the rest of the system with quick-disconnect connectors instead of with wingnuts and the like. A system 2 and other systems disclosed herein may be modified to form system 200 or a similar system by removing all food processors 3 and attaching a distal end of the system from which the food processors 3 were removed to a baseplate to which a number of items may be coupled, such as the mold of system 200 (this also may entail rotating the system to a vertical position), and replacing the food holder with the plunger, or a dough press, or a candy plunger, and the like. Likewise system 2 and other systems can be converted into a system similar to system 146 but with corer 174 instead of coring and slicing member 154, for a coring-only device. Because some systems may be converted from coring, slicing, peeling and/or infusing devices into devices which provide pressing operations, the rotator components of systems disclosed herein may be designed to provide sufficient pressing force vertically when a pressing or plunging operation is performed, such as to press a dough into a pie pan.

Any of the food holders disclosed herein may be coupled with the rotator using threads, such as by being screwed into place.

Coring and slicing member 154 may be used for processing larger food items, such as a pineapple, and system 146 may accordingly be sized (as may any of the other systems) to receive such a large food item. The frames of the systems disclosed herein may be made adjustable in length and/or height for such a purpose. For larger food items the food item may be held by a food holder which has retention pins and that is smaller in diameter than the inside diameter of hollow shaft 158 (so that the pins will not interfere with the coring and slicing member 154 but will pass inside the hollow shaft 158 during operation) or the food item may be held by the base or to the base with some other type of attachment. Coring and slicing member 154 may be increased in size to accommodate larger items such as a pineapple, a watermelon, a cantaloupe, and so forth.

In implementations the peeler of any system disclosed herein may be stationary in a direction parallel to the rotation axis of the rotator and in other implementations the peeler may be movable along this direction. The peeler may be able to be fixed at certain positions along this direction or it may simply be variable along this direction during a peeling operation such as with springs and the like to give it some freedom of motion.

In implementations slicer 76 is coupled with the peeler, or to the elements which couple the peeler to the base, and may be retractable. The slicer may maintain a constant position relative to the rotation axis of the rotator although the peeler moves relative to the rotation axis of the rotator. The corer may be removed or otherwise not attached to the system and this may allow an item to be peeled and sliced but not cored, which is useful for food items with usable cores, such a potato. In implementations such as this where a corer is not used the slicer 76 may be positioned so that it slices all the way to the center of the food item (or in other words extends all the way to the axis of rotation of the rotator).

As described somewhat herein, each food processor 3 and/or moving element in any given system may be driven by a separate motor or a plurality or all of the food processors and/or moving elements in any given system may be driven by a single motor using various transfer gears and the like. Food processing systems may include circuitry, software and the like for: for controlling the operation of each food processor 3 and/or moving element; controlling the operation of each blade; controlling the rate and amount of infusion ingredient dispensed; controlling whether the flow of infusion ingredient is constant or intermittent; controlling the temperature of the infusion ingredient (which in some cases may mean the system includes a heating or cooling element coupled with the reservoir or other portion of the infuser), and the like. Any motorized food processing system may utilize any type of drive energy.

In places where the description above refers to particular implementations of food processing systems and related methods and implementing components, sub-components, methods and sub-methods, it should be readily apparent that a number of modifications may be made without departing from the spirit thereof and that these implementations, implementing components, sub-components, methods and sub-methods may be applied to other food processing systems and related methods.

What is claimed is:

1. A food processing system, comprising:
  a slicer configured to slice a food item so that the food item has at least one gap present between slices in the food item during slicing of the food item, and;
  an infuser coupled with the slicer and including a reservoir containing an infusion ingredient, the infuser configured to deposit a portion of the infusion ingredient into the at least one gap during slicing;
wherein the infuser is coupled with the slicer through being one of integrally formed and fixedly coupled to a blade comprised in the slicer.

2. The food processing system of claim 1, further comprising a peeler configured to peel the food item.

3. The food processing system of claim 1, further comprising a corer configured to core the food item.

4. The food processing system of claim 3, further comprising a peeler configured to peel the food item.

5. The food processing system of claim 1, wherein the infuser comprises a hollow cylindrical tube having a tapered dispensing end.

6. The food processing system of claim 1, wherein the infuser includes one of a manually operated syringe and a motorized piston.

7. A food processing system, comprising:
a base configured to rest on a flat surface;
a food holder coupled with the base and configured to hold a food item;
a food processor coupled with the base and comprising a slicer configured to slice the food item;
a rotator coupled with the base and configured to rotate the food item relative to the food processor;
a linear displacer coupled with the base and configured to linearly displace the food item relative to the food processor in a direction substantially perpendicular to a rotation of the rotator, and;
an infuser coupled with the base and configured to deposit an infusion ingredient between slices of the food item during slicing of the food item;
wherein the food processor further comprises a peeler configured to peel the food item.

8. The food processing system of claim 7, wherein the infuser comprises a dispensing end positioned immediately behind the slicer relative to an unsliced portion of the food item.

9. The food processing system of claim 7, wherein the infuser is configured to deposit the infusion ingredient into one or more gaps located between the slices of the food item while the slicer is slicing the food item.

10. The food processing system of claim 7, wherein the infuser is operatively coupled with the rotator so that the infuser deposits the infusion ingredient between the slices of the food item in response to the rotation of the rotator.

11. The food processing system of claim 7, wherein the infuser is controlled by a piston that is driven independent of the rotation of the rotator.

12. The food processing system of claim 7, wherein the infusion ingredient comprises one of a liquid and a gel.

13. The food processing system of claim 7, wherein the food processor further comprises a corer configured to core the food item.

14. The food processing system of claim 13, wherein the food processor further comprises a peeler configured to peel the food item.

15. The food processing system of claim 13, wherein the rotator includes a retention member extending radially outwards from an axis of the rotator configured to contact an outer surface of the food item when insertion pins of the food holder are inserted into the food item.

* * * * *